UNITED STATES PATENT OFFICE.

ARMAND MÜLLER JACOBS, OF NEW YORK, N. Y., ASSIGNOR TO THE UNIVERSAL COLOR COMPANY, OF NEW YORK.

PHOTOGRAPHY.

SPECIFICATION forming part of Letters Patent No. 358,816, dated March 1, 1887.

Application filed October 23, 1886. Serial No. 217,036. (No specimens.)

*To all whom it may concern:*

Be it known that I, ARMAND MÜLLER-JACOBS, residing at New York, in the county of New York and State of New York, have invented certain new and useful Improvements in Photography; and I do hereby declare the following to be a full, clear, and exact description of the invention, such as will enable others skilled in the art to which it appertains to make and use the same.

This invention relates to photography.

It consists in the employment, for the purposes of photography, of resinates, especially those not readily soluble in water, such as the resinates of certain metals and organic bases.

I find that the resinates of metals and organic bases by exposure to light change their properties as to solubility and as to resistance to bleaching and oxidizing agents and acids, different resinates differing in degree of such change.

Before exposure to light the resinates not readily soluble in water are soluble in benzole and various other hydrocarbons, in ether, chloroform, and bisulphide of carbon, and are almost indifferent to the action of bleaching agents, such as hypochlorite of sodium; but after exposure to light I find that they become more or less insoluble in the above named solvents, and are affected by these bleaching agents.

I have particularly employed the resinates of alumina, zinc, magnesia, silver, and of quinine.

The resinates may be employed uncolored, or they may be colored, as by a color in solution, such as an aniline color, or by a pigment finely divided, such as ultramarine, or by both.

For the purposes of this invention I prefer to use the resinate of magnesia, and this colored with an aniline color.

As an illustration of how to carry out my invention, I will give the following example: I first prepare the resinate of magnesia, and, by preference, in the following manner: I take a neutral resin-soap solution, add to the same carefully a solution of a salt of magnesia, such as the sulphate or chloride, and wash and dry the resulting precipitate—resinate of magnesia. I produce this precipitate colored either by adding a solution of the desired color to the resin-soap solution or to the magnesia-salt solution before precipitation, or by passing an aqueous or alcoholic solution of the color through the dry precipitate. I then, after drying, dissolve the resinate in benzole, ether, chloroform, bisulphide of carbon, or other suitable solvent. I then coat the surface upon which I wish to produce the photograph with the solution, and then expose it to the action of light in the usual manner—that is, either in a photographic camera or under the picture, drawing, or other matter which I wish to reproduce, if this be upon transparent or translucent material.

When I wish to produce the negative of an object, I subject the prepared surface, after suitable exposure to the action of benzole, ether, bisulphide of carbon, chloroform, or similar solvent which will affect or remove those parts which have not been exposed to the action of light without materially affecting the parts which have been so exposed.

When I wish to produce the positive of an object, I subject the prepared surface, after suitable exposure to light, to the action of hypochlorite of sodium, oxidizing agents, alkalies, or acids which will affect those parts or the color on those parts of the surface which have been exposed to the light without materially affecting the parts or the color of the parts which have not been exposed to light.

Photographs can be so produced upon any surface which is not liable to injury by the action of the above-named chemicals.

I have found that the photographs can be made more durable by the addition of a caoutchouc, gutta-percha, or india-rubber solution, or the solution in benzole, &c., of other suitable bodies to the solution of the colored resinate before the same is applied to the surface on which the photograph is to be produced. I have also found that the different-colored resinates differ in degree in their resistance to light, and therefore, if I use a resinate colored with a mixture of two or more colors of different powers of resistance, the photograph obtained will show different colors and shades. I have also found that I can use in place of the salts of the acid or acids contained in resin—that is to say, in place of the pure or simple resinate—the salts of the chlorine, bromine, or iodine substitution products of such acids, intending hereby to claim the use, for instance, of bibromo or bi iodo-abietic acid, instead of the pure acid of the resins.

Having thus fully described my invention, what I claim as new, and desire to secure by Letters Patent, is—

1. The new process of photography, which consists in coating a suitable surface upon which it is desired to produce a photograph with a solution of a resinate of a metal or of an organic base, subjecting the prepared surface then to the action of light, as described, and then to the action of a suitable agent to obtain a negative or a positive of an object, as desired, substantially as set forth.

2. In the art of photography, the employment of a resinate as the essential sensitizing medium, substantially as and for the purpose set forth.

3. As a new article of manufacture, a resinate photograph, substantially as described.

In testimony whereof I affix my signature in presence of three witnesses.

ARMAND MÜLLER-JACOBS.

Witnesses:
R. G. DYRENFORTH,
JAS. M. LEHMAIER,
LOUIS BROWN.